United States Patent Office 3,164,861
Patented Jan. 12, 1965

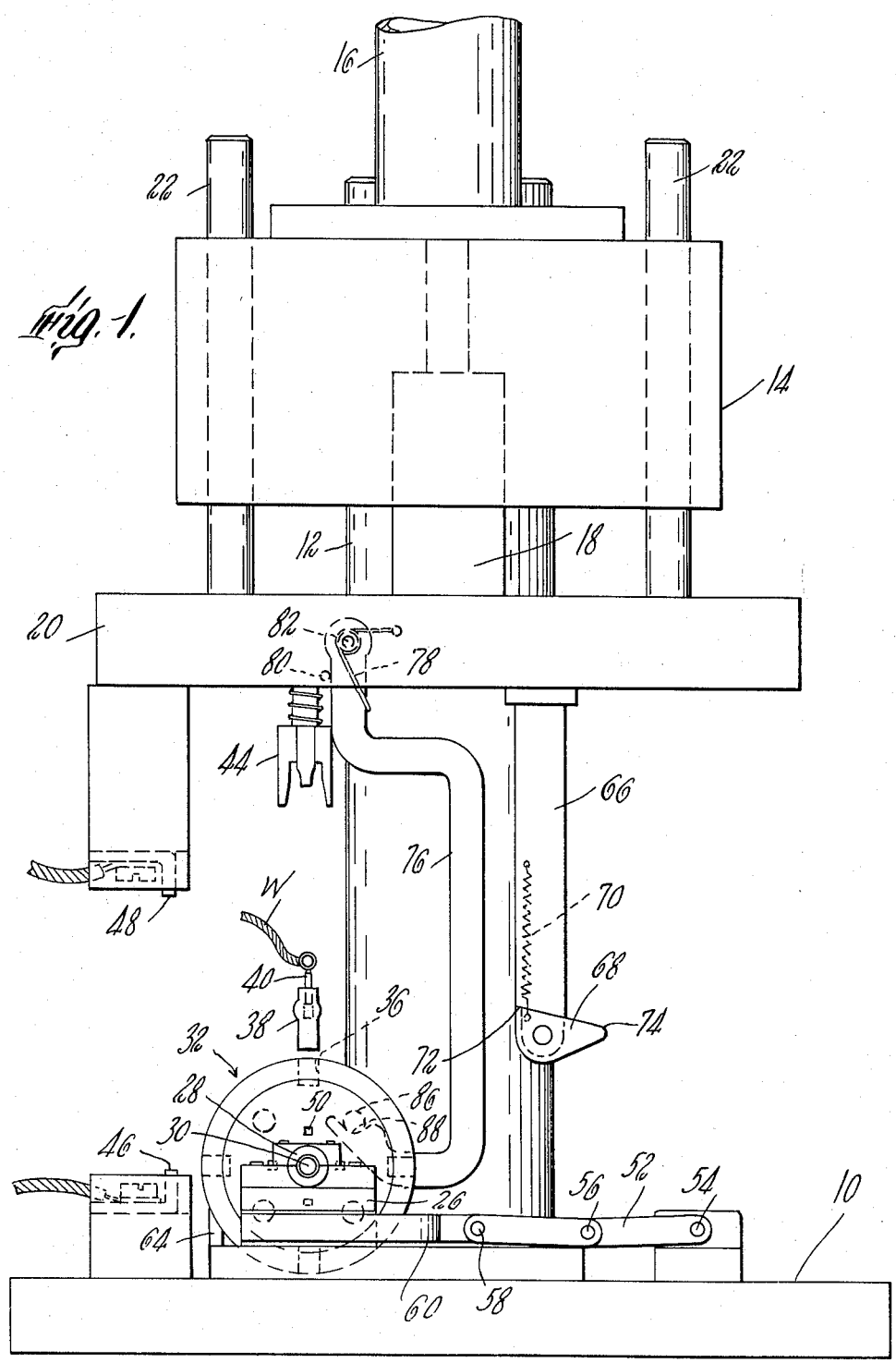

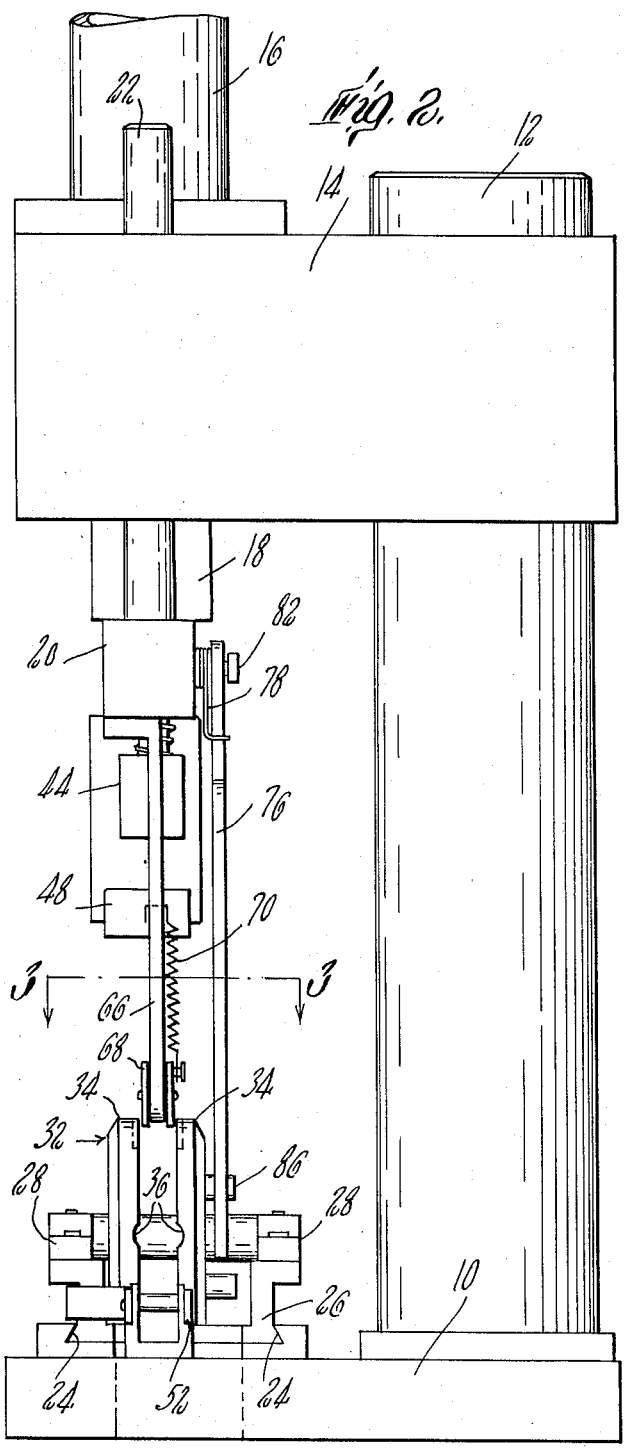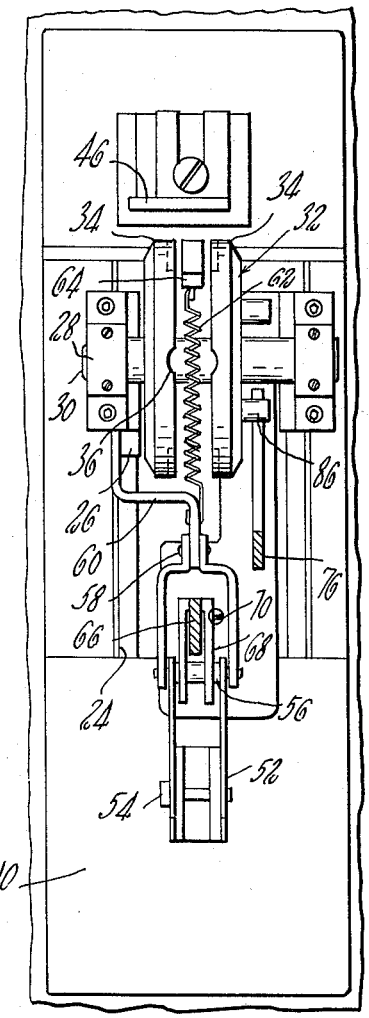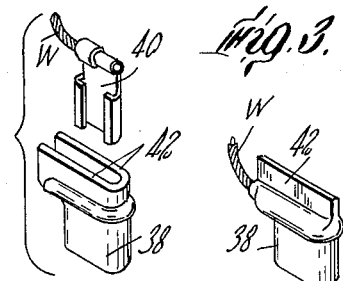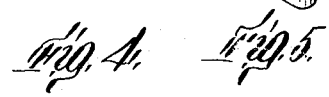

3,164,861
SLEEVE SEALING MACHINE
Charles Leo Munroe, Medford, and Stefan Tomczak, Dorchester, Mass., assignors to Ark-Les Switch Corporation, Watertown, Mass., a corporation of Massachusetts
Filed Dec. 10, 1963, Ser. No. 329,411
4 Claims. (Cl. 18—5)

This invention relates to a machine for the clamping and sealing of enclosing coverings over small articles. Typical apparatus according to this invention is designed to apply heat and pressure against the lips of an insulating sleeve surrounding a connection terminal, thereby sealing these edges of this insulating covering together and completing an insulated terminal assembly. Although the equipment hereinafter shown and described is intended to pinch and heat-seal the open top of a form of insulating boot after a "flag" type electrical connection terminal with wire attached has been inserted therein, obviously the apparatus according to the invention may be modified to perform a similar sealing operation on other shapes of enclosing coverings used on other types of terminals or such small parts.

A general object of this invention is to provide repetitive production apparatus with mechanisms for holding an unsealed assembly in position for sealing, for applying sealing pressure (and heat if required) to the assembly, for removing a sealed assembly after its completion, and for moving a series of successive assemblies through the holding and positioning, sealing and removing steps.

Another object of the present invention is to provide a machine of the class described, with a holder for properly and safely supporting an assembly accurately in position for sealing action by a clamp-like pressure producing mechanism.

Still another object is to provide in such apparatus a device and arrangements for removing an assembly from the holder after completion and sealing.

A further object is to provide, in such equipment, a facility for moving the holder quickly to present an unsealed assembly in precise position to be sealed.

A still further object is to provide a machine of the character described that is relatively simple in construction, easy to make, rugged, and dependable in action, for the rapid production of sealed assemblies on an economical basis.

These and other objects of the invention are met by providing a heating and sealing clamp next to a rotatable holder which is adapted frictionally to receive a plurality of assemblies at angularly spaced index points around its periphery. The holder is also mounted for sliding movement toward and away from the clamp and an ejector in the form of a finger will remove an assembly from the holder whenever the holder is moved away from the clamp. A single driven operating member furnishes the power to pinch the parts of the clamp together for sealing an assembly, to slide the holder away from the ejector for removing a sealed assembly, and to rotate the holder for moving another assembly into position for clamping and sealing. This same operating member may also be provided with a plunger for pressing the parts of an assembly firmly into friction fit with the holder, for sealing at a subsequent time.

Other objects and further details of what which is believed to be novel and included in this invention will be clear from the following description and claims, taken with the accompanying drawings in which are illustrated an example of machine for completing and sealing an assembly and an example of one type of assembly that may be completed and sealed by the machine.

In the drawings:

FIG. 1 is a side elevational view of apparatus according to the invention, showing a particular assembly about to be inserted therein;

FIG. 2 is an end elevational view of the machine of FIG. 1;

FIG. 3 is a horizontal transverse sectional view through a portion of the apparatus of FIG. 2 substantially on the line 3—3 thereof;

FIG. 4 is a combined or exploded perspective view of a wire with connection terminal thereon and an insulating enclosing boot or sleeve of a particular type for which the exemplary machine was designed;

FIG. 5 is a perspective view of the terminal and boot of FIG. 4 in assembled position, and sealed;

Figure 6:
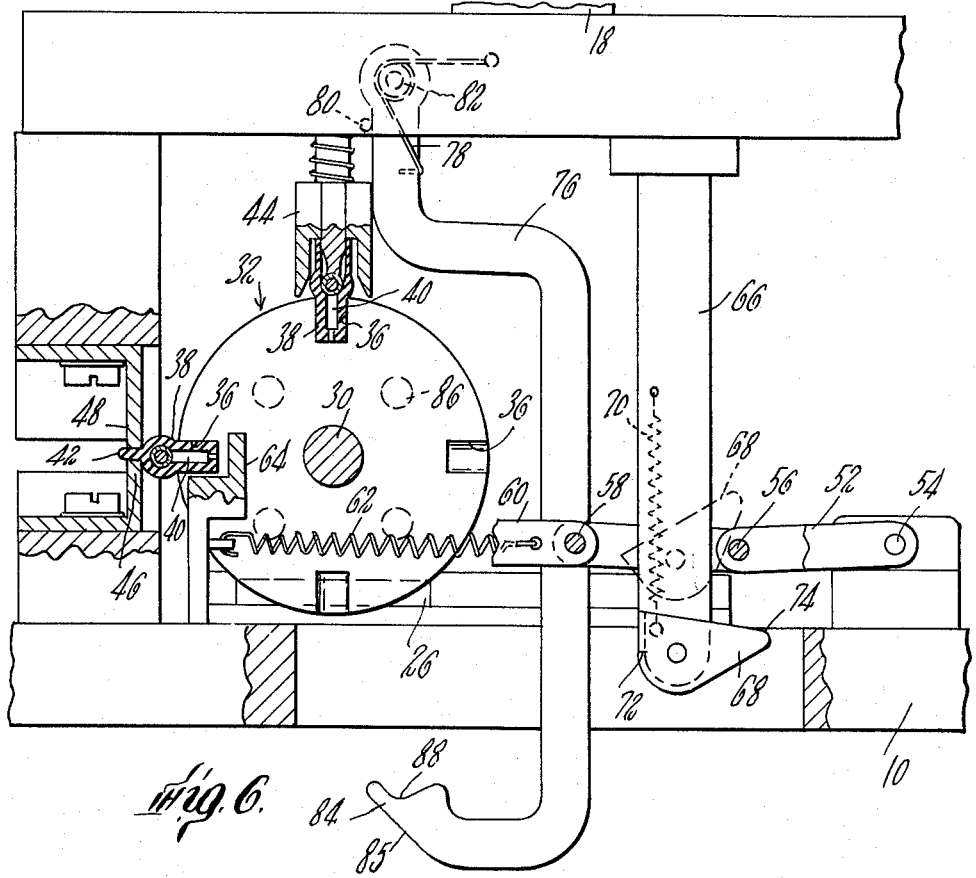
FIG. 6 is a slightly enlarged sectional view of a portion of the machine from the same viewpoint as FIG. 1 but showing the parts in a different operating position.

In carrying out the objects of this invention, in one embodiment thereof, apparatus in the form of an hydraulic or pneumatic press is provided, having a base 10 suitably supported at a convenient height with a main supporting post 12 extending upwardly from the base and carrying a head 14, which may be adjustably secured on the supporting post with respect to the base in a fashion readily understood. The head of the press may carry a pneumatic or hydraulic cylinder 16 with conventional pressure lines (not shown) for reciprocating a piston 18 between positions toward and away from the base of the press. Because hydraulic or pneumatic press operating and controlling devices of this nature are well known, they need not be described here excepting to note that such devices and controls are arranged normally to hold the piston in raised position until operation of the apparatus is desired. When operated, the piston will be moved toward the base for a given or set distance, held in its downward position for a desired length of time and then returned upwardly to its normal position, away from the base.

An operating member, shown here as the cross bar 20, is carried by the piston and in turn carries various members and mechanisms for actuating the sealing apparatus in the desired manner. The cross bar may be guided in its upward and downward movement not only by the piston in the head of the press but also by guide rods 22 passing through suitable guideways in the head.

Below the cross bar the base is provided with horizontal ways 24 slidably receiving a carriage 26 which is movable back and forth in directions at right angles to the directions of movement of the cross bar. This carriage has a pair of horizontal journals 28 that rotatably support the ends of a central shaft 30 of an indexing wheel 32. This wheel in reality is a pair of spaced disks on the shaft 30 somewhat like a "yo-yo" and is made of an insulating material for reasons that will later become obvious. At spaced points about the periphery of the disks 34 of the wheel, shown here at angular spacings of 90°, the inside face of each disk is provided with a recess or cavity 36 each adapted frictionally to receive an assembly of the type for which the particular apparatus is designed, these assemblies being held firmly in place at the index points established by the cavities until deliberately removed by pressure exerted in a radial direction outwardly.

This indexing wheel or assembly holder and its manner of mounting and action are important features in the present invention because they are involved in properly and safely supporting an assembly accurately in position for sealing, involved in removing an assembly after completion and sealing, and in moving an unsealed assembly quickly to a position to be sealed following the sealing of a preceding assembly. The holding function of the recesses of the cavities 36 is explained above, and in the exemplary machine, when the cross bar or operating member is in normal raised or rest position, the top one of the cavities will receive an open top insulating boot 38 within which a "flag" type wire connection terminal 40 on the end of a wire W is designed to be sealed. As FIGS. 4 and 5 indicate, the open top edge or lip 42 of the boot, above the connection terminal and wire when they are fully inserted, is adapted to be squeezed together and sealed to complete the assembly. Obviously, the machine may be modified or adapted to perform a similar sealing operation on terminal assemblies of other designs using insulating sleeves of other shapes, or the machine may be utilized in making seals of this character on assemblies of articles used for purposes other than wire terminals. With the particular type of assembly here shown, the boot and terminal are first manually or automatically placed together in proper relative position and inserted in the top cavity of the indexing wheel. This loading of the wheel may be done by hand, and the fingers of the operator may provide sufficient pressure to seat the boot fully in the cavity and to seat the terminal fully in the boot. However, the particular type of assembly here illustrated adapts itself peculiarly to positioning in the holder by machine action and for this purpose the cross bar 20 may slidably carry a spring pressed plunger assembly 44 having elements at its sides that will engage against the lip 42 of the boot and an element at its center that will engage against the top of the terminal 40, pressing the parts of the assembly into the proper relation and seating them fully in one of the cavities when the cross bar reciprocates to bring the plunger against an assembly in the holder. Some designs of assembly are not adapted for this operation and in such cases the plunger assembly may be eliminated from the cross bar. However, and in any case, when the assembly is fully inserted, the top edge or lip 42 of the assembly will extend outwardly of the periphery of the indexing wheel for sealing operation following an indexing of the wheel.

Without going into the mechanism for obtaining the indexing at this time, when the wheel is rotated after being loaded it will be turned counterclockwise as seen in FIG. 1 so that the top loaded cavity will move to a position opposite a fixed clamping member or electrode 46, and the lip 42 of the boot in the previously loaded cavity will lie against the top surface of this clamping member.

The other part of the clamping and sealing mechanism is shown here as an upper movable electrode 48 suitably carried on one end of the cross bar and movable therewith. As the cross bar is moved by the piston from its normal raised position toward its lowered position the assembly in the cavity at the top of the indexing wheel will first be pressed firmly into place by the plunger 44 and shortly thereafter the lip of an assembly in a previously loaded cavity next to the electrode 46 will be squeezed between this electrode and the movable electrode 48 to produce the desired sealing. The parts of the sealing clamp are spoken of as electrodes because it is preferred that these parts are connected to a source of high frequency current so that radio frequency heating may be applied to the insulating sleeve or boot covering the assembly, whenever the clamp pinches the top edge or lip 42.

Resistance heating of the clamp parts might be used if preferred, or the heating might be eliminated entirely if an adhesive is applied to the sleeve before clamping it. The application of heat, its degree and the timing depends upon the particular material of the sleeve and the manner of joining the edges to form a seal. Manual or automatic controls may be provided in the usual way for applying heat when it is called for.

During the downward movement of the operating member or cross bar, when it is approaching its lowermost assembly clamping position and pressing a preceding assembly firmly into a top recess or cavity in the indexing wheel, this wheel is held in a fixed position near the members of the clamp. Four equally spaced detent recesses 50 in one of the disks 34 of the wheel are engaged one at a time by a single spring-pressed detent element (not shown) that may be mounted in the carriage 26 near one of the journals 28. The detenting arrangement may be such that it will oppose any rotation of the wheel in a clockwise direction as seen in FIG. 1 but will permit counterclockwise rotation upon the application of suitable pressure on the wheel in that direction.

The carriage, and the indexing wheel mounted on it, are held against sliding movement away from the clamp while the cross bar is moving in its downward direction, this being accomplished by a toggle linkage 52. The linkage has a fixed pivoted end 54 on the base of the press, a central pivot bar 56 at the knee of the toggle and a sliding pivoted end 58 connected to a bracket 60 on the carriage. When the toggle is in straightened position with its links aligned, it limits movement of the carriage and the indexing wheel carried thereon toward the sealing clamp, and a tension spring 62, extending between the carriage and a fixed point on the base, constantly urges the carriage and wheel toward this position. As shown, the spring can be anchored at one end in an appropriate hole in the bracket 60 of the carriage and at the other end around a hook or lug in the upwardly extending fixed ejector finger 64, fixed to the base near the fixed lower electrode 46. As seen in FIG. 6, this ejector finger may be provided with an offset end which will clear one side and the bottom of a recess or cavity 36 when it is indexed to a position opposite the clamp member 46. As will be seen from FIG. 7, when the wheel is moved slidably away from the clamp, the offset end of the ejector finger will engage against and remove an assembly from the recess.

Figure 7:
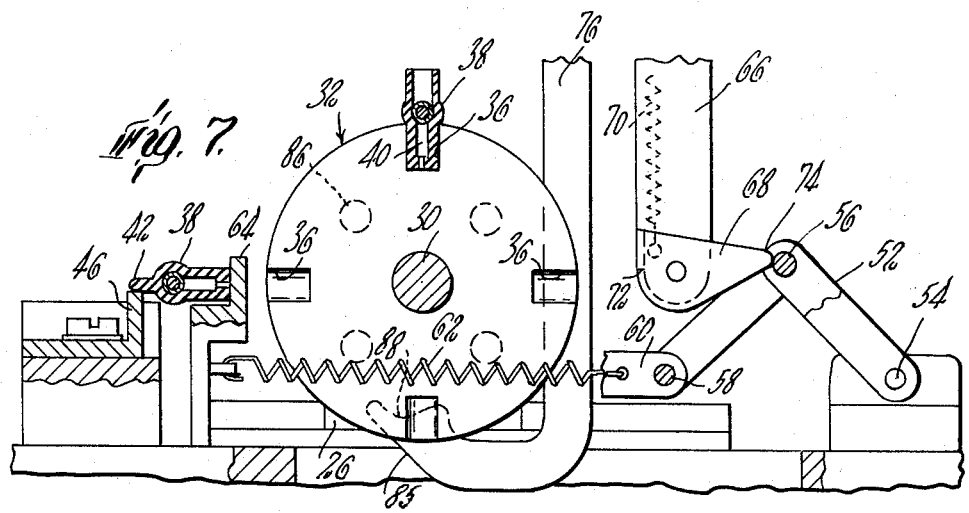
FIG. 7 is a sectional view like FIG. 6 but showing the parts in still another position of operation.

In order to slide the wheel way from the clamp so that a sealed assembly may be ejected as above described, the cross bar 20 is provided with a downwardly directed ejector cam supporting post 66 carrying at its lower end a pivoted ejector cam 68. This cam is constantly biased in a clockwise direction about its pivotal mounting as by a spring 70, but its rotation in a clockwise direction is limited by an appropriate stop shoulder 72 on the supporting post 66. However, as the cross bar is lowered toward clamping position, the nose or tip 74 of the cam will first ride over the pivot bar 56 at the knee of the toggle linkage, as shown in dotted lines in FIG. 6, and when past the knee of the toggle, will be returned to a position, shown in full lines in FIG. 6, with the nose of the cam underneath the pivot bar of the toggle knee. When a sealing operation has been completed and the cross bar is being raised toward its original normal position again, the top surface of the cam 68 will engage under the pivot bar 56 of the toggle knee and raise the central portion of the toggle, pulling the sliding pivoted end 58 of the linkage and moving the carriage 26 and wheel 32 against the tension of the carriage biasing spring 62 and away from the clamp and fixed ejector finger. At some suitable point determined by the proper dimensioning of the parts, the center of the toggle linkage will swing sufficiently about its fixed pivoted end 54 so that the pivot bar 56 will ride off the end of the cam 68, as shown in FIG. 7, and the tension spring 62 will again move the carriage and indexing wheel, straightening the toggle linkage so that these parts will be in the relative positions shown in FIG. 1. A completed and sealed assembly will thus have been stripped or ejected from the indexing wheel so that another assembly may be indexed to proper position for sealing.

Indexing of the wheel is also accomplished by the downward and upward cycling of the cross bar. At a point on the cross bar which may be generally above the location of the indexing wheel, an indexing lever 76 is pivoted, biased as by a spring 78 toward a stop pin 80 to swing in a clockwise direction about its pivot 82. As shown, this indexing lever is of an elongated C-shape and it has a bottom edge or tip 84 so dimensioned, formed and located that the following actions are accomplished by this lever: First, as the cross bar is lowered, an upwardly slanting face 85 on this indexing lever tip engages against and rides over a lug 86 in the wheel 32, the slanting surface on the tip swinging the lever 76 in counterclockwise direction until the tip clears the lug and the lever passes below it, as indicated in FIG. 6. The lug 86 is one of four shown on the indexing wheel, these being located at equally spaced angular locations corresponding to the angular locations of the indexing points or assembly receiving cavities 36. The wheel has been secured at one of the detent recesses 50 to prevent rotation clockwise of the wheel while the indexing lever was being forced around and under the lug 86.

During the next upward movement of the cross bar, but after the ejector cam has broken the toggle and the wheel has been moved away from and then back toward the clamp, the tip 84 of the indexing lever 76 will engage under the lug 86 that it has previously cleared, an appropriate dwell 88 in the end of the lever being provided for this purpose. Further upward movement of the cross bar will raise the indexing lever and move the lug 86 upwardly in a counterlockwise direction about the central shaft 30 of the wheel, overcoming the frictional holding of the detent recesses 50, until the cross bar and indexing lever are in their fully raised positions. At this point the lug 86 engaged by the indexing lever will be vertically above the position it originally occupied and the parts will be at rest in the relative positions shown in FIG. 1. A succeeding detent will hold the wheel in its newly indexed position and against further accidental rotation. The top cavity 36 on the indexing wheel will be free for the reception of another boot and terminal assembly so that upon the next cycle this may be clamped and sealed. The assembly now next to the clamp is in position to be sealed whenever desired, having been previously loaded in the top cavity of the wheel.

A complete working cycle of the machine for one assembly really includes two reciprocations or oscillations of the cross bar. From a starting position with the cross bar raised, the top cavity is loaded. A cycle of the cross bar is started and as the cross bar moves downwardly the plunger 44 engages against the top of the connection terminal 40 and the sides of the insulating boot 38, pressing these parts together and firmly into the top recess 36 just before the electrode clamps 46 and 48 at the side of the indexing wheel come together. Assuming that no previous assembly has been loaded into the machine, the cross bar will then be returned to its normal raised portion and in the process, the pressure of the plunger 44 will first be relieved from the assembly in the top cavity, the toggle will reciprocate the indexing wheel and the wheel will be indexed to bring the former top cavity to the side position next to the clamping electrode. A new top cavity is thus available for loading while the cross bar is in its raised position. In the next cycle, as the cross bar starts down, it will first press an assembly together and into the top cavity and shortly thereafter the member 48 will pinch the edges of an assembly against the fixed electrode 46 to seal the assembly now on the side of the wheel. The cross bar is left in its fully lowered position for a sufficient length of time to complete the seal and then it is started on its upward movement. During its upward movement the cross bar will first release the sealed assembly from the clamp at the side of the wheel, next will relieve the pressure from the plunger at the top of the wheel, and then will slide the wheel away from the clamp and from the ejector finger, stripping the sealed assembly from the side cavity. As soon as the cam passes the toggle knee, the wheel will be slid back into position next to the electrode clamps and the wheel will be indexed one quarter turn to move the previously loaded top cavity to its position at the side next to the clamp. Further cycling of the machine will continue to produce sealed assemblies as long as a new assembly is loaded at the top of the wheel before each cycle period.

As will be evident from the foregoing description, certain aspects of this invention are not limited to the particular details set forth as an example, and it is contemplated that various and other modifications and applications of the invention will occur to those skilled in the art. It is therefore intended that the appended claims shall cover such modifications and applications as do not depart from the true spirit and scope of the invention.

What is claimed as new and is desired to be secured by Letters Patent of the United States is:

1. Apparatus for sealing the edges of a sleeve together to complete an assembly, comprising
    a fixed part and a cooperating movable part, together forming a clamp for pressing and sealing the edges of a said sleeve introduced therein,
    a holder with a periphery adapted frictionally to receive and hold a plurality of said assemblies at angularly spaced index points therearound,
    a rotatable mount for said holder, supporting it for stepwise rotation of its periphery between angles corresponding to the locations of said index points,
    a sliding support for said holder, mounting it with respect to said clamp for reciprocating movement through a cycle including a first position with said periphery of said holder adjacent said clamp, movement to a second position with said periphery withdrawn from said clamp and a return movement back to said first position,
    an ejector adjacent and fixed with respect to said fixed clamp part, adapted to engage and withdraw an assembly from said holder when moved from said first position to said second position in a cycle,
    an operating member oscillatable from a rest position to an active position and back to rest position again,
    means actuated by said operating member, when oscillated, to move said movable clamp part and press and seal the edges of a sleeve introduced in said clamp; to reciprocate said holder through a cycle on said sliding support and cause said ejector to withdraw an assembly from said holder; and to rotate said holder on said rotatable mount stepwise through an angle corresponding to an index point spacing.

2. Apparatus for sealing an insulating sleeve about a wire connection terminal to complete a sleeve and terminal assembly, comprising
    a sealing clamp including a fixed portion and a cooperating relatively movable portion for engagement with a sleeve and terminal assembly positioned between said portions,
    an assembly holder element adapted frictionally to receive and removably hold a plurality of said assemblies at a series of spaced index points about its periphery,
    a rotatable mount for said holder element for indexing movement of said element between index points about a central axis while its periphery is in a first position adjacent said fixed portion of said clamp,
    a sliding support for said holder element for cyclic reciprocating movement of said element, from said first position adjacent said clamp, to a second position with the periphery of the holder withdrawn from said fixed portion of the clamp and back to said first position,
    an ejector for removing a sleeve and terminal assembly from a said index point on said holder element, said ejector being adjacent said clamp, fixed with respect to said fixed portion of said clamp and operable to engage against and remove a sleeve and terminal assembly from said holder element when said element is reciprocated from said first position adjacent said clamp to said second, withdrawn position, an operating member movable toward and away from said holder element in a direction generally at right angles to the direction of said cyclic reciprocating movement of said holder element, means actuated by said operating member during its movement toward said holder for moving said movable portion of said clamp into cooperative relation with said fixed portion thereof to seal a sleeve and terminal assembly positioned between said portions and held at an index point on said holder element, means actuated by said operating member during part of its movement away from said holder element for operating said sliding support to reciprocate said holder element through a cycle and cause said ejector to remove a sleeve and terminal assembly from said element as aforesaid, and means also actuated by said operating member during said movement away from said holder for operating said rotatable mount to index said holder element about said central axis between adjacent index points on its periphery.

3. Apparatus as claimed in claim 2 including means applying heat to seal the edges of a sleeve engaged between said fixed portion and said movable portion of said clamp.

4. Apparatus for sealing the edges of an insulating boot about a wire connection terminal to complete an insulated boot and terminal assembly, comprising heat applying clamping means including a fixed electrode and a cooperating vertically movable electrode for engagement with the edges of a boot and terminal assembly positioned between said electrodes, an assembly holder wheel adapted frictionally to receive and removably to hold a plurality of said assemblies at a series of spaced index cavities about its circumference, a rotatable mount for said holder wheel for indexing movement of said wheel about a horizontal central axis with its circumference in a first position adjacent said fixed electrode of said clamping means, a horizontal sliding support for said holder wheel for cyclic horizontal reciprocating movement of said wheel without rotation, from said first position adjacent said clamping means to a second position with the circumference of the wheel withdrawn horizontally from said fixed electrode of the clamping means, and back to said first position, an ejector finger for removing a boot and terminal assembly from a said index cavity on said holder wheel, said finger being fixed with respect to said fixed electrode of said clamping means and having a hooked end to engage against and remove a boot and terminal assembly from said holder wheel cavity when said wheel is reciprocated to said second withdrawn position, an operating plunger vertically movable toward and away from said holder wheel in a direction perpendicular to the direction of reciprocating movement of said holder wheel, said operating plunger, during its movement toward said wheel, moving said movable electrode of said clamping means into cooperative relation with said fixed electrode thereof to heat and seal the edges of a boot and terminal assembly positioned between said electrodes at an index cavity on said holder wheel, means on said operating plunger operable when said plunger is so moved, for pressing the parts of a boot and terminal assembly together and firmly into friction holding fit with a succeeding index cavity on said holder wheel, a toggle actuated by said operating plunger during part of its movement away from said holder wheel for operating said sliding support to reciprocate said holder wheel horizontally and cause said ejector finger to remove a boot and terminal assembly from said wheel cavity as aforesaid, and a lever carried by said operating plunger, actuated during movement of the plunger further away from said holder wheel for rotating said wheel mount to index said holder wheel about its axis between adjacent cavities on its circumference.

References Cited in the file of this patent
UNITED STATES PATENTS

| | | |
|---|---|---|
| 2,316,593 | Judisch | Apr. 13, 1943 |
| 2,510,464 | Danziger | June 6, 1950 |
| 2,692,424 | Habel | Oct. 26, 1954 |
| 2,882,553 | Cahill et al. | Apr. 21, 1959 |